US012647661B2

(12) United States Patent
Lingehed

(10) Patent No.: US 12,647,661 B2
(45) Date of Patent: Jun. 2, 2026

(54) VISION DEVICE AND VISION APPARATUS FOR A MOTOR VEHICLE

(71) Applicant: Magna Electronics Sweden AB, Vårgårda (SE)

(72) Inventor: Vincent Lingehed, Linköping (SE)

(73) Assignee: Magna Electronics Sweden AB, Vårgårda (SE)

( * ) Notice: Subject to any disclaimer, the term of this patent is extended or adjusted under 35 U.S.C. 154(b) by 0 days.

(21) Appl. No.: 18/857,698

(22) PCT Filed: Apr. 19, 2023

(86) PCT No.: PCT/EP2023/060132
§ 371 (c)(1),
(2) Date: Oct. 17, 2024

(87) PCT Pub. No.: WO2023/208683
PCT Pub. Date: Nov. 2, 2023

(65) Prior Publication Data
US 2025/0254406 A1 Aug. 7, 2025

(30) Foreign Application Priority Data
Apr. 29, 2022 (EP) ..................................... 22170794

(51) Int. Cl.
H04N 23/50 (2023.01)
B60R 11/04 (2006.01)
H04N 23/57 (2023.01)

(52) U.S. Cl.
CPC ............. H04N 23/50 (2023.01); B60R 11/04 (2013.01); H04N 23/57 (2023.01)

(58) Field of Classification Search
CPC ........ H04N 23/50; H04N 23/57; B60R 11/04; B60R 2011/0026
See application file for complete search history.

(56) References Cited

U.S. PATENT DOCUMENTS

| | | | |
|---|---|---|---|
| 10,556,551 B2 | 2/2020 | Krug et al. | |
| 2015/0015713 A1* | 1/2015 | Wang ..................... | B60R 11/04 348/148 |

(Continued)

FOREIGN PATENT DOCUMENTS

| | | |
|---|---|---|
| EP | 3323679 A1 | 5/2018 |
| EP | 3180212 B1 | 11/2018 |
| WO | 2019222291 A1 | 11/2019 |

OTHER PUBLICATIONS

International Search Report and Written Opinion of PCT/EP2023/060132, mailed Jul. 6, 2023.

*Primary Examiner* — Michael Lee
(74) *Attorney, Agent, or Firm* — DICKINSON WRIGHT PLLC

(57) ABSTRACT

A vision device (11) for a motor vehicle adapted to capture images of the surrounding of the motor vehicle and includes alignment elements (21a-21c, 23a-23b) each adapted to cooperate with a corresponding alignment counter-element (42a-42c, 44a-44b) of a holding part (15) in order to align the vision device (11) relative to the holding part (15). Each alignment element (21a-21c, 23a-23b) has a planar surface (22, 24) adapted to abut against a planar surface (43, 45) of the corresponding alignment counter-element (42a-42c, 44a-44b).

10 Claims, 5 Drawing Sheets

(56)        References Cited

U.S. PATENT DOCUMENTS

| | | | |
|---|---|---|---|
| 2016/0191863 A1* | 6/2016 | Minikey, Jr. ........... | H04N 23/57 |
| | | | 348/148 |
| 2017/0064165 A1 | 3/2017 | Onishi | |
| 2017/0240120 A1 | 8/2017 | Krug et al. | |
| 2018/0065571 A1* | 3/2018 | Hart ........................ | B60R 11/04 |
| 2019/0248301 A1* | 8/2019 | Edgarian ................. | B60R 11/04 |
| 2021/0031704 A1 | 2/2021 | Lamoureux | |
| 2022/0009425 A1* | 1/2022 | Tokito .................... | G03B 30/00 |

* cited by examiner

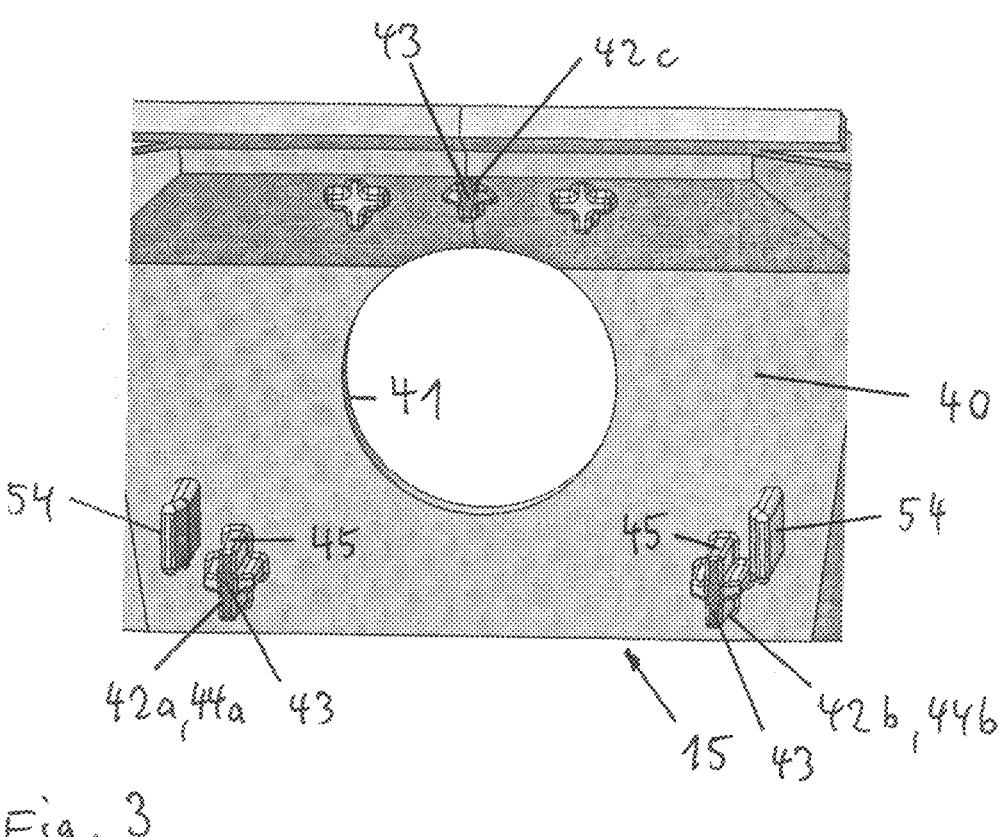
Fig. 3
Fig. 4
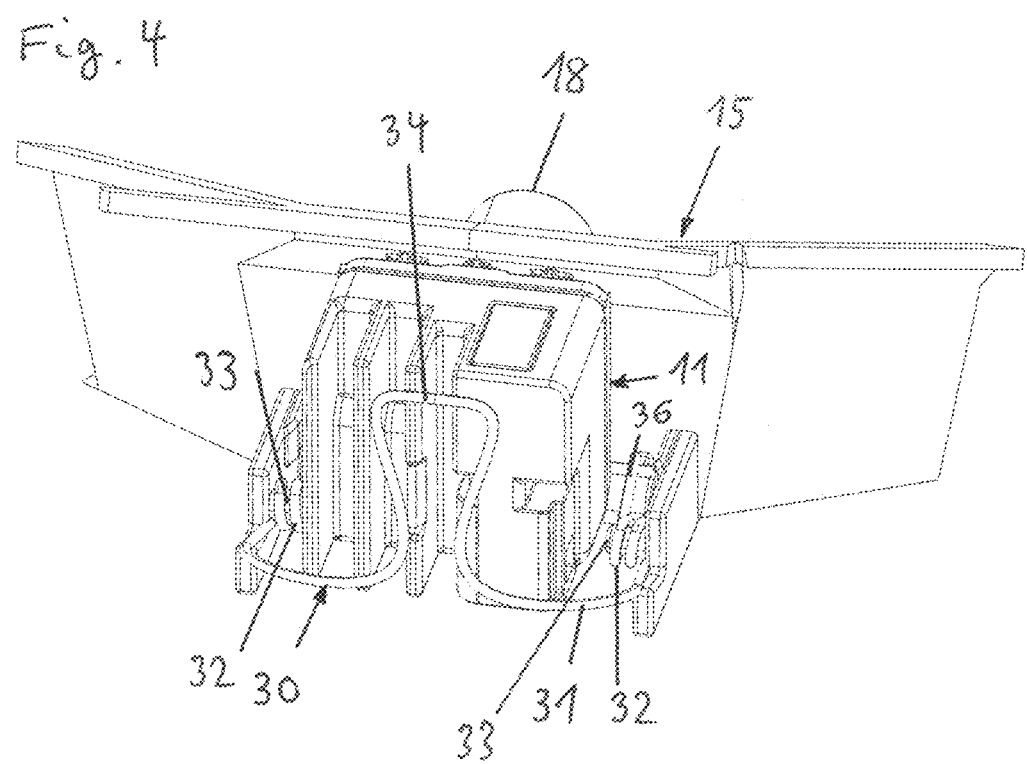

VISION DEVICE AND VISION APPARATUS FOR A MOTOR VEHICLE

CROSS-REFERENCE TO RELATED APPLICATIONS

This application is a 35 U.S.C. § 371 national phase of PCT International Application No. PCT/EP2023/060132, filed Apr. 19, 2023, which claims the benefit of priority under 35 U.S.C. § 119 to European Patent Application No. 22170794.6, filed Apr. 29, 2022, the contents of which are incorporated herein by reference in its entirety.

FIELD OF THE INVENTION

The invention relates to a vision device for a motor vehicle, wherein the vision device is adapted to capture images of the surrounding of the motor vehicle and comprises alignment elements each adapted to cooperate with a corresponding alignment counter-element of a holding part in order to align the vision device relative to the holding part. The invention also relates to a vision apparatus for a motor vehicle, comprising at least one vision device having alignment elements, and a holding part having alignment counter-elements.

Such a vision device and vision apparatus are for example known from EP 3 180 212 B1 and WO 2019/222291 A1.

BACKGROUND

When installing a vision device like a camera in a motor vehicle, the alignment between the vision device and the motor vehicle, more specifically a holding part fixed to the motor vehicle, like a bracket or a light trap, is a critical parameter. Alignment comprises position and orientation, where for the present application orientation is in general a more sensitive parameter. As a general requirement in the automotive industry, the interface handling the alignment between the holding part and the vision device must be robust and forgiving.

The problem underlying the present invention is to provide a vision device and a vision apparatus enabling a robust, forgiving and highly precise alignment interface between the holding part and the vision device components.

The invention solves this problem with the features of the exemplary embodiments of this invention described below and depicted by the appended drawing figures.

Summary and Introductory Description of Exemplary Embodiments of the Invention According to embodiments of the invention, each alignment element has a planar surface adapted to abut against a planar surface of the corresponding alignment counter-element. The planar surfaces of the alignment elements can be manufactured with highest precision, and are more robust and forgiving than known alignment elements having a more complex form.

Preferably the alignment elements comprise one or more, preferably three, first alignment elements, the planar surface of which is perpendicular to an optical axis of the optical device. The contact points of the planar surfaces of the first alignment elements constrain the vision device with respect to up to three degrees of freedom, namely rotation of the vision device about two perpendicular axes both perpendicular to an optical axis of the vision device, and/or translation along the optical axis of the vision device.

In a preferred embodiment, the first alignment elements comprise two first baseline elements, wherein the connection line between the two first baseline elements is parallel to a pre-defined axis of the vision device. The vision device comprises at least two such pre-defined axes, namely a direction parallel to the lines of the light-sensitive sensor, which is usually a horizontal direction in a mounted state, and a direction parallel to the columns of the light-sensitive sensor, which is usually a vertical direction in a mounted state, where horizontal and vertical refer to a coordinate system of the vision device and/or to a coordinate system of the motor vehicle. The first baseline, i.e., the connection line of the two first baseline elements can be horizontal, or parallel to the lines of the light-sensitive sensor. In other embodiments, the first baseline could be vertical, or parallel to the columns of the light-sensitive sensor. Generally, any orientation of the first baseline under an angle between 0° and 90° relative to the horizontal or vertical is possible. Preferably the distance between the two first baseline elements is more than half, preferably more than ⅔ of the maximum extension of the vision device parallel to the first baseline, which yields a higher angular precision of the alignment.

Preferably the first alignment elements comprise a stop element arranged with a distance to the connection line between the two baseline elements. Preferably the distance between the stop element and the connection line between the first baseline elements is more than half, preferably more than ⅔ of the maximum extension of the vision device perpendicular to the first baseline, which yields a higher angular precision of the alignment.

Preferably the alignment elements comprise one or more, preferably two, second alignment elements, the planar surface of which is parallel to an optical axis of the optical device.

The contact points of the planar surfaces of the second alignment elements constrain the vision device with respect to up to two further degrees of freedom, namely rotation of the vision device about the optical axis of the vision device, and translation along an axis perpendicular to the optical axis of the vision device.

In a preferred embodiment, the second alignment elements comprise two second baseline elements, wherein the connection line between the two second baseline elements is parallel to a pre-defined axis of the vision device (as mentioned above), and/or parallel to the connection line between first baseline elements. The second baseline, i.e., the connection line of the two second baseline elements can be horizontal, or parallel to the lines of the light-sensitive sensor. In other embodiments, the second baseline could be vertical, or parallel to the columns of the light-sensitive sensor. Generally, any orientation of the second baseline under an angle between 0° and 90° relative to the horizontal or vertical is possible. Preferably the distance between the two second baseline elements is at least ⅔ of the maximum extension of the vision device parallel to the corresponding connection line., i.e., the second baseline, which yields a higher angular precision of the alignment.

Preferably, the planar surfaces of at least two first alignment elements lie in the same plane and/or the planar surfaces of at least two second alignment elements lie in the same plane, in order to avoid unwanted shearing forces on the vision device.

In a preferred embodiment, two pairs each consisting of a first alignment element and a second alignment element form two L-shaped elements arranged collinear to each other, such that inner edges of the L-shaped elements lie on a common hinge axis. In this hinge embodiment, the alignment elements can be positioned such that four contact points lock the hinge axis, and then a fifth contact point locks the rotation around the hinge axis.

In another preferred embodiment, the second alignment elements lie in an intermediate region of the vision device along a pre-defined axis perpendicular to the optical axis of the vision device (intermediate region or mid-plane embodiment).

Preferably, the alignment element has the form of a ridge and/or the planar surface of the or each alignment element has the form of a strip, and more preferably, the or each alignment counter-element has the form of a ridge and/or the planar surface of the alignment counter-element has the form of a strip. In this case, the length axis of the ridge or strip of the or each alignment counter-element is oriented perpendicular to the length axis of the ridge or strip of the corresponding alignment element, yielding a preferred point-shaped contact between corresponding contact surfaces.

The alignment between the vision device and the holding part requires that the alignment elements are in contact with their respective alignment counter elements. This is preferably achieved by one or more force exerting elements acting between the vision device and the holding part, which press one or more planar surfaces of the alignment elements against the corresponding one or more planar surfaces of the alignment counter-elements. The force exerting element preferably is a spring element, like a spring wire. In a preferred embodiment, the force exerting element is a U-shaped spring bracket connectable to the holding part at its two end sections, and being adapted to encompass the vision device, where the spring bracket preferably has a bulge section in a central part thereof for exerting a pressing force on the vision device towards the holding part. Preferably, the force exerting element is adapted to exert a pressing force in two directions, namely in a direction perpendicular to the contact surfaces of the first alignments elements, and also in a direction perpendicular to the contact surfaces of the second alignments elements. This reduces the number of parts in comparison to providing two separate force exerting elements.

The remaining degree of freedom of the vision device preferably is a translational degree of freedom, for example with respect to translation of the vision device an axis perpendicular to the optical axis of the vision device. The remaining degree of freedom of the vision device can be fixed by one or more additional alignment elements, for example gap or clearance fit elements provided at the holding part, which act on corresponding elements on the vision device. Alternatively or in addition to gap/clearance fit elements, a further pair of contact surfaces perpendicular to the translation axis of the remaining translation degree of freedom can be provided, defining a further contact point between the vision device and the holding part in addition to the five contact points described above.

The camera alignment interface according to the invention provides a number of advantages. All features of a component can be made in one tooling half which facilitates stable geometrical variation (applicable for die/mould manufacturing processes). Clearance to parting lines which may interfere with the alignment can be provided (applicable for die/mould manufacturing processes). Geometrical requirements are comparatively intuitive which also facilitates an intuitive verification of the requirements. Mechanical analysis and rework of non-conforming components are comparatively intuitive. Orientation between the vision device and the integration mechanics are repeatable/reproducible.

BRIEF DESCRIPTION OF THE DRAWINGS

In the following the invention shall be illustrated on the basis of preferred embodiments with reference to the accompanying drawings, wherein:

FIG. 3 shows a perspective view on the rear side of a holding part in the first embodiment from slightly above;

FIG. 4 shows a perspective view of a mounted vision apparatus in the first embodiment from the rear side;

DETAILED DESCRIPTION OF EXEMPLARY EMBODIMENTS OF THE INVENTION

Figure 1:
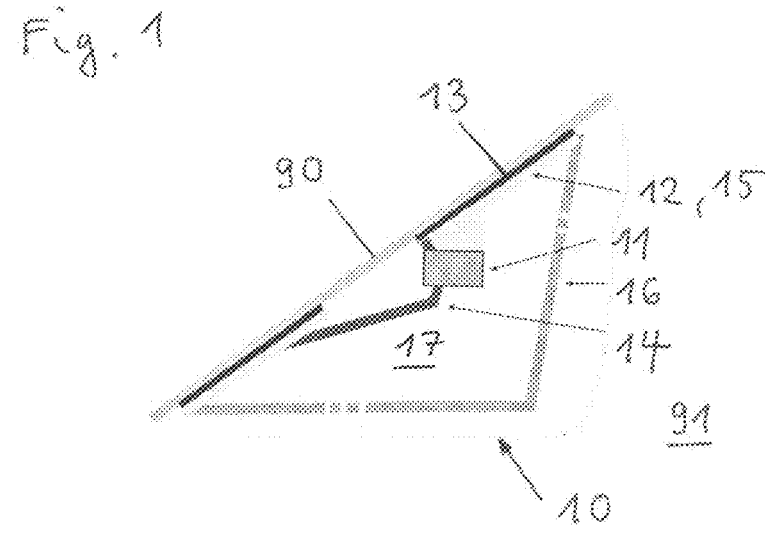
FIG. 1 shows a schematic cross section of a vision apparatus mounted to the windshield of a motor vehicle.

The vision apparatus 10 is mounted, or mountable, to the windscreen 90 of a motor vehicle, and comprises at least one vision device 11, in particular a camera, and a bracket 12 carrying the vision device 11 and having a mounting surface for being mounted to the windshield 90 via an adhesive layer 13. In particular, the vision apparatus 10 may comprise two vision devices 11, forming a stereo vision apparatus, or one vision device 11, forming a mono vision apparatus. The vision devices 11 are directed towards the surrounding, in particular the front, of the motor vehicle, such that the optical axis of the vision device 11 goes through the windscreen 90. The vision apparatus 10 may also comprise a light trap 14, which may be a separate part, or integrated into the bracket 12, such that the light trap 14 and the bracket 12 form a single piece. The vision apparatus 10 may also comprise a beauty cover 16 for covering the vision device 11 against the passenger compartment 91 of the motor vehicle. In other words, the one or more vision devices 11 are arranged within the inner volume 17 of the beauty cover 16.

Throughout this application, the holding part 15 may be formed by the bracket 12 and/or by the light trap 14.

Figure 2:
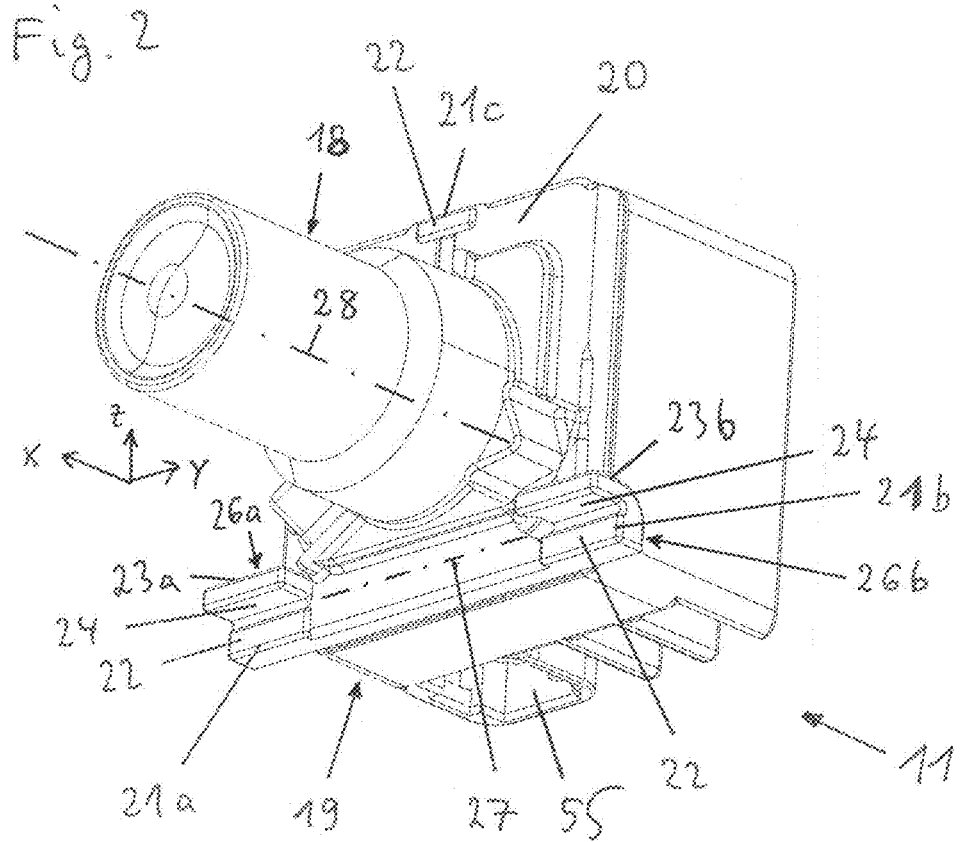
FIG. 2 shows a perspective view on the front side of a vision device in a first embodiment from slightly below.

A first embodiment of a vision apparatus 10 is shown in FIGS. 2 to 4. A second embodiment of a vision apparatus 10 is shown in FIGS. 5 to 10.

Figure 5:
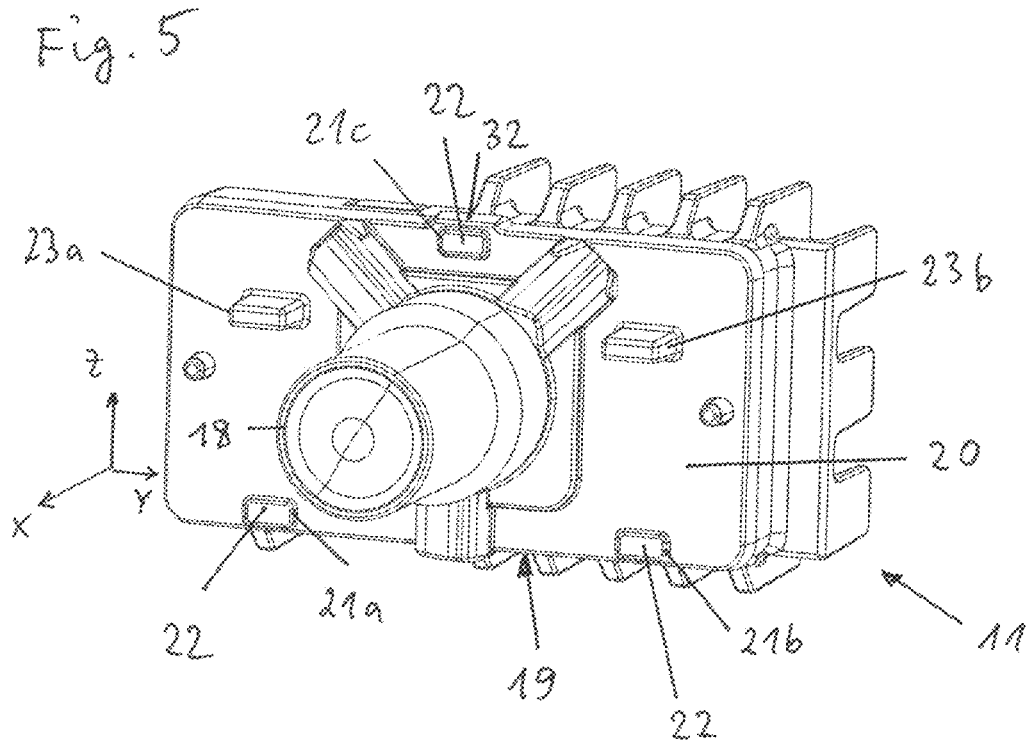
FIGS. 5, 6 show a perspective view on the front side of a vision device in a second embodiment from slightly above and slightly below, respectively.
Figure 6:
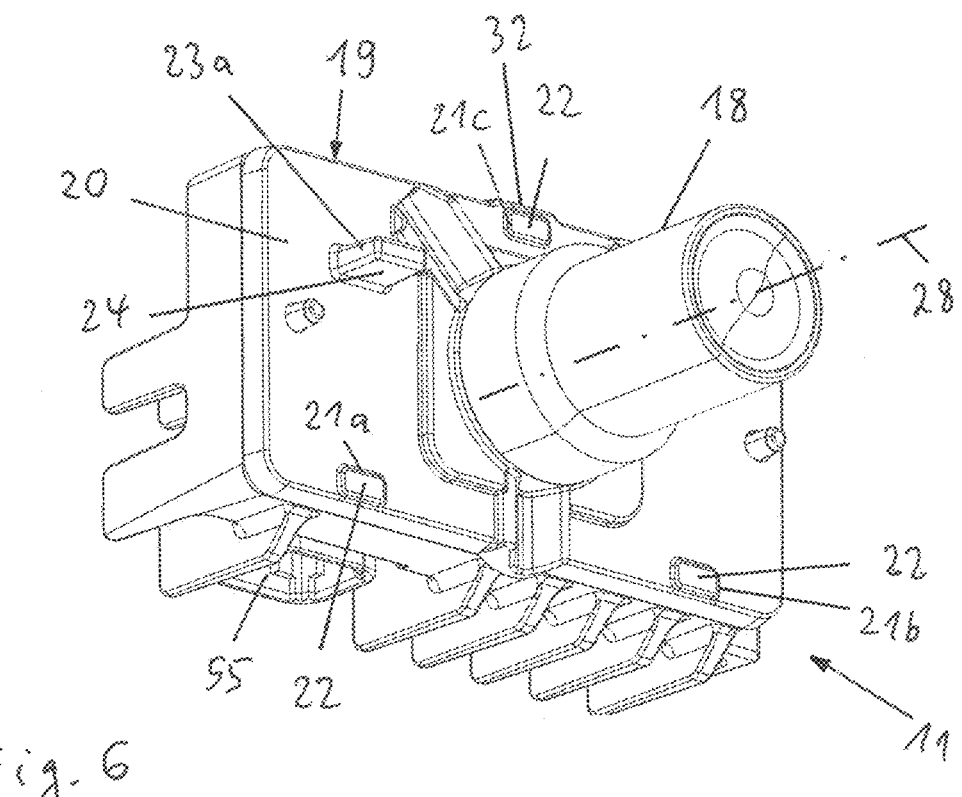

The vision device 11 shown in FIGS. 2, 5 and 6 is a camera and comprises a lens objective 18, a camera housing 19 and a light-sensitive 2-dimensional sensor (not shown in the Figures) arranged within the camera housing 19 at focal plane of the lens objective 18 and adapted to convert light entering the vision device 11 into an electrical signal comprising image information. The vision device 11, more specifically the camera housing 19, comprises a front side 20 directed in the same direction as the lens objective 18, namely towards the windscreen 90 and to the surrounding of the motor vehicle.

Figure 7:
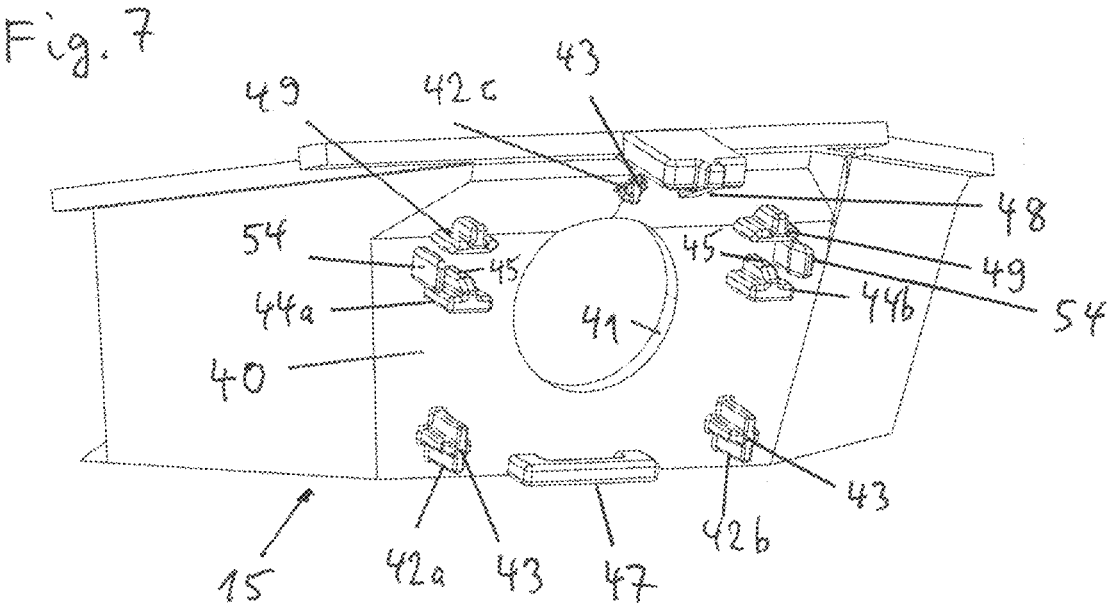
FIGS. 7, 8 show a perspective view on the rear side of a holding part in the second embodiment from slightly above.
Figure 8:
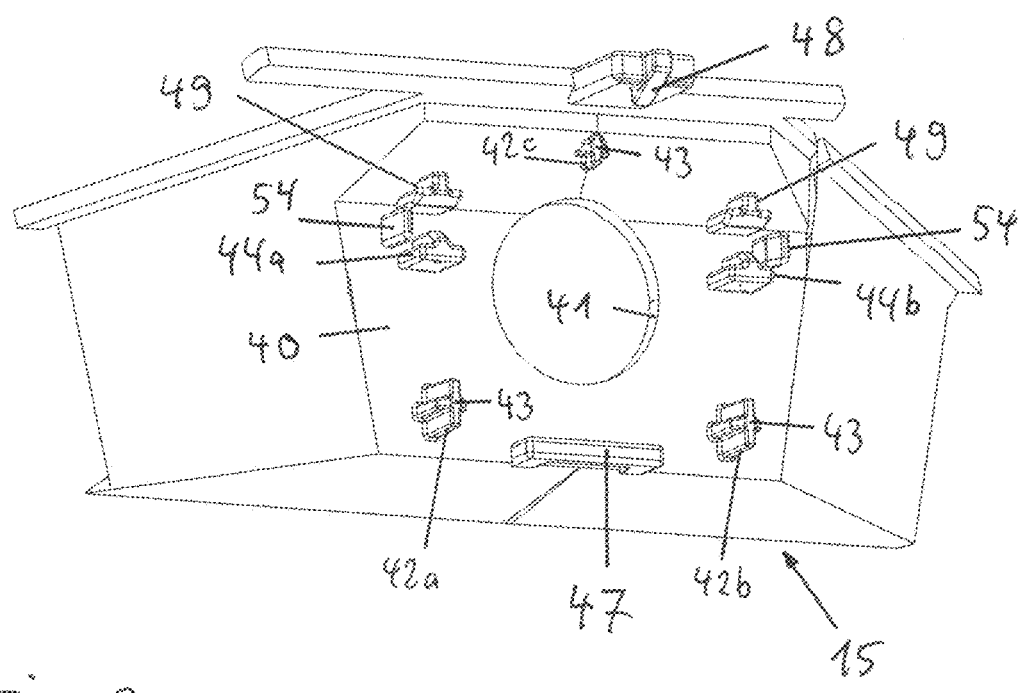

The vision device 11 is adapted to be mounted to a holding part 15 shown in FIGS. 3, 7 and 8. More specifically, the front side 20 of the vision device 11 is adapted to cooperate with a rear side 40 of the holding part 15, as will be explained below. The holding part 15 may comprise an opening 41, the inner diameter of which matches with the outer diameter of the lens objective 18, such that the lens objective 18 can be put through the opening 41 during mounting the vision device 11 to the holding part 15.

On the front side 20 of the vision device 11, a plurality of first alignment elements 21a, 21b, 21c is arranged. The first alignment elements 21a, 21b, 21c have a planar contact surface 22. All contact surfaces 22 may lie in a single plane, but this is not strictly necessary. Each contact surface 22 is perpendicular to the optical axis 28 of the lens objective 18 within +10°, preferably within +5°, more preferably within +2°, even more preferably within +1°. The number of first alignment elements 21a, 21b, 21c is preferably three. The first alignment elements 21a, 21b, 21c preferably comprise two first baseline elements 21a, 21b, where a connection line of the first baseline elements 21a, 21b defines a first baseline which preferably is arranged parallel to a pre-defined axis of the vision device 11 perpendicular to the optical axis 28.

The vision device 11 comprises at least two such predefined axes, namely a direction parallel to the lines of the light-sensitive sensor, which is usually a horizontal direction in a mounted state, and a direction parallel to the columns of the light-sensitive sensor, which is usually a vertical direction in a mounted state, where horizontal and vertical refer to a coordinate system of the vision device 11 and/or to a coordinate system of the motor vehicle. The first baseline, i.e., the connection line of the two first baseline elements 21a, 21b, can be horizontal, or parallel to the lines of the light-sensitive sensor, like in the Figures. In other embodiments, the first baseline could be vertical, or parallel to the columns of the light-sensitive sensor. Generally, any orientation of the first baseline under an angle between 0° and 90° relative to the horizontal or vertical is possible. Preferably the distance between the two first baseline elements 21a, 21b is more than half, preferably more than ⅔ of the maximum extension of the vision device parallel to the first baseline, here the horizontal extension.

The contact surfaces 22 of the first baseline elements 21a, 21b preferably lie in a single plane.

Preferably the first alignment elements comprise a stop element 21c arranged with a distance along a direction perpendicular to the connection line between the first baseline elements 21a, 21b, here along the vertical direction. Preferably the distance between the stop element 21c and the connection line between the first baseline elements 21a, 21b is more than half, preferably more than ⅔ of the maximum extension of the vision device perpendicular to the first baseline, here the vertical extension.

On the rear side 40 of the holding part 15, a plurality of first alignment counter elements 42a, 42b, 42c is arranged, where each first alignment counter element 42a, 42b, 42c corresponds to one of the first alignment elements 21a, 21b, 21c of the vision device 11, such that the number of first alignment counter elements 42a, 42b, 42c, here three, equals the number of first alignment elements 21a, 21b, 21c. Each first alignment counter element 42a, 42b, 42c has a planar contact surface 43. All contact surfaces 43 may lie in a single plane, but this is not strictly necessary. Each contact surface 43 is perpendicular to the optical axis 28 of the lens objective 18, and thus parallel to the corresponding contact surface 22, within ±10°, preferably within ±5°, more preferably within ±2°, even more preferably within ±1°.

When the vision device 11 is mounted to the holding part 15, in particular when the lens objective 18 is guided through the opening 41 of the holding part 15, the contact surface 22 of each first alignment element 21a, 21b, 21c comes into contact with the contact surface 43 of the corresponding first alignment counter element 42a, 42b, 42c. The contact points of the contacting surfaces 22 and 43 constrain the vision device 11 with respect to three degrees of freedom, namely rotation of the vision device 11 about the y-axis (see FIGS. 2 and 5), i.e., a horizontal axis perpendicular to the optical axis 28 of the lens objective 18, rotation about the z-axis (vertical axis), and translation along the x-axis, i.e., the optical axis 28 of the lens objective 18.

The first alignment elements 21a, 21b, 21c preferably protrude over a front surface 25 of the vision device 11, and preferably have the form of a ridge (here horizontal). The contact surfaces 22 preferably have the form of a strip (here horizontal). The first alignment counter elements 42a, 42b, 42c preferably protrude over a rear surface 46 of the holding part 15 and preferably have the form of a ridge (here vertical). The contact surfaces 43 preferably have the form of a strip (here vertical). The first alignment elements 21a, 21b, 21c and the first alignment counter elements 42a, 42b, 42c are arranged such that the length axis of any two strip-shaped contact surfaces 22, 43 are perpendicular to each other, such that the contact between them is essentially point-shaped.

On the front side 20 of the vision device 11, a plurality of second alignment elements 23a, 23b is arranged. The second alignment elements 23a, 23b have a planar contact surface 24. Each contact surface 24 is parallel to the optical axis 28 of the lens objective 18 within ±10°, preferably within ±5°, more preferably within ±2°, even more preferably within ±1°. The contact surfaces 24 are oriented horizontally for example. The number of second alignment elements 23a, 23b is preferably two. The second alignment elements preferably comprise two second baseline elements 23a, 23b, where a connection line of the second baseline elements 23a, 23b defines a second baseline which preferably is arranged parallel to a pre-defined direction of the vision device 11, as described above.

The second baseline, i.e., the connection line of the two second baseline elements 23a, 23b, can be horizontal, or parallel to the lines of the light-sensitive sensor, like in the Figures. In other embodiments, the second baseline can be vertical, or parallel to the columns of the light-sensitive sensor. Generally, any orientation of the second baseline under an angle between 0° and 90° relative to the horizontal or vertical is possible. Preferably the distance between the two second baseline elements 23a, 23b is more than half, preferably more than ⅔ of the maximum extension of the vision device parallel to the second baseline, here the horizontal extension.

The contact surfaces 24 of the second baseline elements 23a, 23b preferably lie in a single plane.

On the rear side 40 of the holding part 15, a plurality of second alignment counter elements 44a, 44b is arranged, where each second alignment counter element 44a, 44b corresponds to one of the second alignment elements 23a, 23b of the vision device 11. Therefore, the number of second alignment counter elements 44a, 44b, here two, equals the number of second alignment elements 23a, 23b. Each second alignment counter element 44a, 44b has a planar contact surface 45. The contact surfaces 45 preferably lie in a single plane. Each contact surface 45 is parallel to the optical axis 28 of the lens objective 18, and thus parallel to the corresponding contact surface 24, within ±10°, preferably within ±5°, more preferably within ±2°, even more preferably within ±1°.

When the vision device 11 is mounted to the holding part 15, in particular when the lens objective 18 is guided through the opening 41 of the holding part 15, the contact surface 24 of each second alignment element 23a, 23b comes into contact with the contact surface 45 of the corresponding second alignment counter element 44a, 44b. The contact points of the contacting surfaces 24 and 45 constrain the vision device 11 with respect to two degrees of freedom, namely rotation of the vision device 11 about the x-axis (see FIGS. 2 and 5), i.e., the optical axis 28 of the lens objective 18, and translation along the z-axis (vertical axis).

The second alignment elements 23a, 23b preferably protrude over the front surface 25 of the vision device 11, and preferably have the form of a ridge (here perpendicular to the optical axis 28 of the lens objective 18). The contact surfaces 24 preferably have the form of a strip (here perpendicular to the optical axis 28 of the lens objective 18). The second alignment counter elements 44a, 44b preferably protrude over the rear surface 46 of the holding part 15 and preferably have the form of a ridge. The contact surfaces 45 preferably have the form of a strip (here parallel to the optical axis 28 of the lens objective 18). The second alignment elements 23a, 23b and the second alignment counter elements 44a, 44b are arranged such that the length axis of any two strip-shaped contact surfaces 24, 45 are perpendicular to each other, such that the contact between them is essentially point-shaped.

The embodiment of FIGS. 5 to 10 shows that the contact surfaces 24, 45 do not have to be strip shaped. For example, the contact surfaces 24 of the second alignment elements 23a, 23b nearly have the shape of a square, see FIG. 6. If the contact surfaces 24 and/or 45 are not strip shaped, a point-shaped contact is preferably achieved by other means. For example, the orientation of the contact surfaces 24 and/or 45 may slightly deviate from the ideal orientation described above. The same holds for the contact surfaces 22 and/or 43.

The position of the second alignment elements 23a, 23b and the second alignment counter elements 44a, 44b relative to the first alignment elements 21a, 21b, 21c and the first alignment counter elements 42a, 42b, 42c can be chosen in a suited manner. Two preferred embodiments are described in the following.

In the embodiment of FIGS. 2 to 4, each second alignment element 23a, 23b is arranged close to one corresponding first alignment element 21a, 21b to form an L-shaped element 26a, 26b, see FIG. 2. In this embodiment, the first alignment counter element 42a and the second alignment counter element 44a are identical (same for 42b, 44b), where the contact surfaces 43 and 45 are formed by perpendicular surfaces of the common, preferably ridge-shaped alignment counter element 42a, 44a, see FIG. 3. A vice-versa arrangement is possible, i.e., two pairs of the alignment counter elements 42a, 44a and 42b, 44b forming two L-shaped elements, and the first alignment element 21a and the second alignment element 23a being identical (same for 21b, 23b). In this embodiment, the inner edges of the L-shaped elements 26a, 26b preferably lie on a common hinge axis 27. Therefore, this embodiment can be called a hinge embodiment.

In the embodiment of FIGS. 5 to 10, the second alignment elements 23a, 23b are arranged separately and with a distance from the first alignment elements 21a-21c, and correspondingly the second alignment counter elements 44a, 44b are arranged separately and with a distance from the first alignment counter elements 42a-42c. In particular, the second alignment elements 23a, 23b (and consequently also the second alignment counter elements 44a, 44b) are arranged in an intermediate region of the vision device 11 along a pre-defined axis of the vision device 11 as explained above, for example along the vertical axis in FIGS. 5 to 8. Therefore, this embodiment can be called an intermediate region embodiment, or mid-plane embodiment.

The alignment between the vision device 11 and the holding part 15 requires that the alignment elements 21a-21c, 23a-23b are in contact with their respective alignment counter elements 42a-42c, 44a-44b. This is preferably achieved by one or more force exerting elements 30, which, in the mounted state of the vision apparatus 10, exerts a force pressing the contact surfaces 22 of the first alignments elements 21a-21c against the contact surfaces 43 of the first alignments counter elements 42a-42c, and/or a force pressing the contact surfaces 24 of the second alignments elements 23a, 23b against the contact surfaces 45 of the second alignments counter elements 44a-44c. This will be explained in the following with reference to FIGS. 4, 9 and 10, where the force exerting element 30 preferably is a spring element.

In FIG. 4, the force exerting element 30 comprises, or consists of, a spring wire 31 comprising two helical sections wound around two coaxial mounting pins 33 of the holding part 15. The spring wire 31 comprises a central U-bracket section 34 designed to exert a force on the camera housing 19 in the direction of the optical axis 28, in order to press the contact surfaces 22 of the first alignments elements 21a-21c against the contact surfaces 43 of the first alignments counter elements 42a-42c. Furthermore, both end sections 36 of the mounted spring wire 31 are designed to exert a force on parts of the camera housing 19, here the L-shaped parts 26a, 26b laterally protruding over the camera housing 19, with a force component perpendicular to the contact surfaces 24 of the second alignments elements 23a, 23b, in order to press the contact surfaces 24 of the second alignments elements 23a, 23b against the contact surfaces 45 of the second alignments counter elements 44a-44c. In this manner, the mounted spring wire 31 can exert a pressing force in both required directions, namely in a direction perpendicular to the contact surfaces 22 of the first alignments elements 21a-21c, and also in a direction perpendicular to the contact surfaces 24 of the second alignments elements 23a, 23b.

Figure 9:
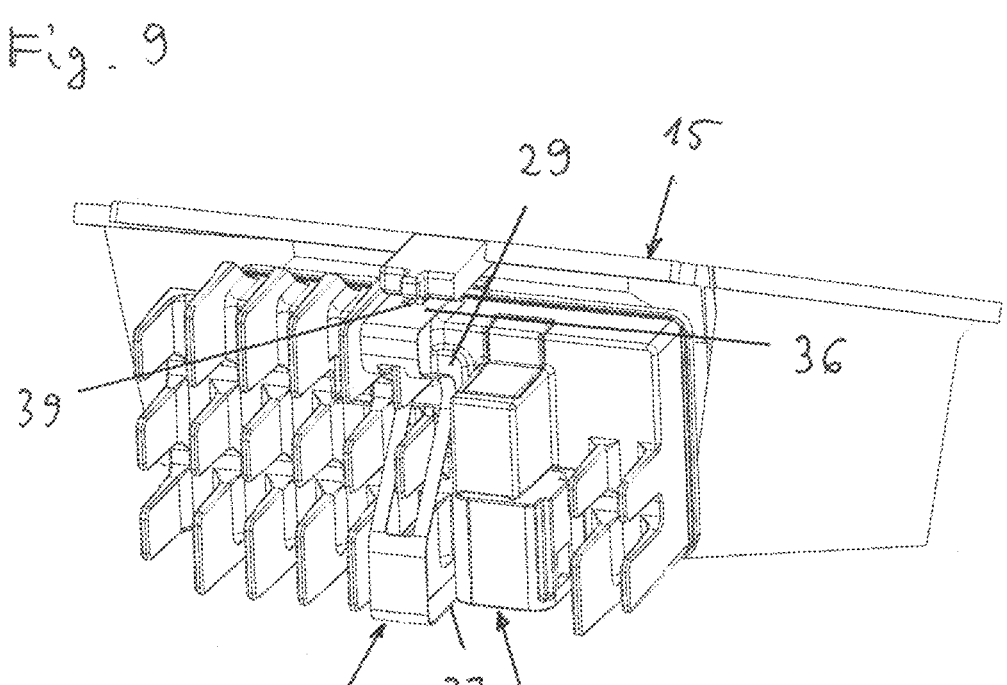
FIG. 9 shows a perspective view of a mounted vision apparatus in the second embodiment from the rear side.
Figure 10:
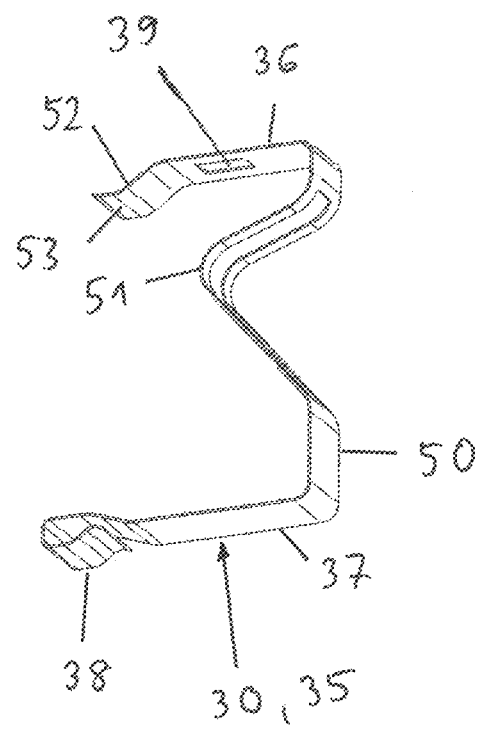
FIG. 10 shows a perspective view of a force exerting element in the form of a spring bracket.

In FIGS. 9 and 10, the force exerting element 30 comprises, or consists of, a U-shaped spring bracket 35 connected to the holding part 15 at both end sections 36, 37 and being adapted to encompass the vision device 11 as shown in FIG. 9. More specifically, the spring bracket 35 can comprise a connector 38, for example a loop formed at the end of one end section 37 of the spring bracket 35 as shown in FIG. 10, which connector 38 is adapted to engage a corresponding connector 47, for example a connection bar, provided at the holding part 15. The loop connector 38 is arranged around the bar connector 47 allowing the spring bracket 35 to be pivoted around the bar connector 47. At the opposite end section 36, a further connector 39, for example an opening in the spring bracket 35, is provided which is adapted to engage a corresponding further connector 48, for example a hook, provided at the holding part 15.

In its central part 50 the spring bracket 35 comprises a bulge section 51 bulging towards the vision device 11 in the mounted state, and adapted to exert a pressing force on the vision device 11 in the mounted state. The vision device 11 may comprise an abutting surface 29 against which the spring bracket 35, more specifically the bulge section 51, can press in the mounted state. The pressing force exerted by the bulge section 51 in the mounted state presses the contact surfaces 22 of the first alignments elements 21*a*-21*c* against the contact surfaces 43 of the first alignments counter elements 42*a*-42*c*.

Furthermore, the spring bracket 35 may comprise an elastic section 52, in particular forming one end of the spring bracket, which is adapted to exert a pressing force on the vision device 11 in the mounted state. The vision device 11 may comprise an abutting surface 32, see FIGS. 5 and 6, against which the spring bracket 35, more specifically the elastic section 51, can press in the mounted state. The spring bracket 35, more specifically the elastic section 51, can have a corresponding abutting section 53 abutting against the abutting section 32 in the mounted state. The pressing force exerted by the elastic section 52 in the mounted state presses the contact surfaces 24 of the second alignments elements 23*a*, 23*b* against the contact surfaces 45 of the second alignments counter elements 44*a*-44*c*. In this manner, the mounted spring bracket 35 can exert a pressing force in both required directions, namely in a direction perpendicular to the contact surfaces 22 of the first alignments elements 21*a*-21*c*, and also in a direction perpendicular to the contact surfaces 24 of the second alignments elements 23*a*, 23*b*.

Additional elements 49 can be provided at the rear side 40 of the holding part 15 for absorbing large mounting forces that may occur when an electrical connector not shown is inserted into a socket 55 (see FIGS. 2 and 6) from below. Such mounting forces are transmitted through the second alignment elements 23*a*, 23*b* abutting against the additional elements 49 from below.

The remaining degree of freedom of the vision device 11 preferably is a translational degree of freedom, here with respect to translation of the vision device 11 along the y-axis, i.e., a horizontal axis perpendicular to the optical axis 28 of the lens objective 18. The remaining degree of freedom of the vision device 11 can be fixed for example by gap fit elements 54 provided at the rear side 40 of the holding part 15, which act on corresponding elements on the front side 20 of the vision device 11, for example on the second alignment elements 23. Alternatively or in addition to the gap fit elements 54, a further pair of contact surfaces perpendicular to the translation axis of the remaining translation degree of freedom can be provided, defining a further contact point between the vision device 11 and the holding part 15 in addition to the five contact points described above.

While the above description constitutes the preferred embodiment of the present invention, it will be appreciated that the invention is susceptible to modification, variation and change without departing from the proper scope and fair meaning of the accompanying claims.

The invention claimed is:

1. A vision device for a motor vehicle, wherein the vision device is adapted to capture images of a surrounding of the motor vehicle and comprises; at least one alignment element each adapted to cooperate with a corresponding one of at least one alignment counter-element of a holding part in order to align the vision device relative to the holding part, the alignment element has a planar surface adapted to abut against a planar surface of the corresponding alignment counter-element, wherein the at least one alignment element comprises three first alignment elements, a planar surface of each of the first alignment elements is perpendicular to an optical axis of the vision device, wherein the one or more alignment element comprises two or more second alignment elements, a planar surface of which is parallel to an optical axis of the vision device, wherein the two or more second alignment elements lie in an intermediate region of the vision device along a pre-defined axis perpendicular to the optical axis of the vision device, and wherein at least one of the first alignment elements is spaced apart from each of the two or more second alignment elements.

2. The vision device as claimed in claim 1, wherein the first alignment elements comprise two first baseline elements, wherein a connection line between the two first baseline elements is parallel to a pre-defined axis of the vision device perpendicular to the optical axis, wherein the first alignment elements each comprises a stop element arranged with a distance to the connection line between the two baseline elements.

3. The vision device as claimed in claim 1, wherein the second alignment elements comprise two second baseline elements, wherein the connection line between the two second baseline elements is parallel to a pre-defined axis of the vision device perpendicular to the optical axis, or parallel to the connection line between alignment elements comprising first baseline elements.

4. The vision device as claimed in claim 1, further comprising the planar surfaces of at least two first alignment elements lie in the same plane or the planar surfaces of at least two of the second alignment elements lie in the same plane.

5. A vision device for a motor vehicle, wherein the vision device is adapted to capture images of a surrounding of the motor vehicle and comprises; at least one alignment element each adapted to cooperate with a corresponding one of at least one alignment counter-element of a holding part in order to align the vision device relative to the holding part, the alignment element has a planar surface adapted to abut against a planar surface of the corresponding alignment counter-element, wherein the at least one alignment element comprises three first alignment elements, a planar surface of each of the first alignment elements is perpendicular to an optical axis of the vision device, wherein the one or more alignment element comprises two or more second alignment elements, a planar surface of which is parallel to an optical axis of the vision device, and wherein two pairs of the alignment elements each consist of one of the first alignment elements and one of the second alignment elements together forming two L-shaped elements arranged collinear to each other, such that inner edges of the L-shaped elements lie on a common hinge axis.

6. The vision device as claimed in claim 3, further comprising one or more of:

the distance between the two first baseline elements, the distance between the stop element and the connection line between the first baseline elements, and the distance between the two second baseline elements, is more than half of a maximum extension of the vision device parallel or perpendicular to the corresponding connection line.

7. The vision device as claimed in claim 1, further comprising in that the alignment element has the form of a ridge or the planar surface of the alignment element has the form of a strip.

8. The vision device as claimed in claim 1, further comprising in that at least one force exerting element acting between the vision device and the holding part is provided, which is adapted to press the planar surface of one or more alignment elements against the corresponding planar surface of the corresponding one or more alignment counter elements.

9. The vision device as claimed in claim 1, wherein the vision device comprises one or more additional alignment elements for limiting a remaining degree of freedom of the vision device relative to the holding part.

10. A vision apparatus for a motor vehicle, comprising:

at least one vision device for a motor vehicle, wherein the at least one vision device is adapted to capture images of a surrounding of the motor vehicle, wherein the the at least one vision device comprises at least one alignment element each adapted to cooperate with a corresponding one of at least one alignment counter-element of a holding part in order to align the vision device relative to the holding part, the alignment element has a planar surface adapted to abut against a planar surface of the corresponding alignment counter-element, wherein the holding part has alignment counter-elements, wherein each alignment element of the vision device is adapted to abut against a corresponding alignment counter-element of the holding part in order to align the vision device relative to the holding part, wherein the one or more alignment counter-element has the form of a ridge or the planar surface of the one or more alignment counter-element has the form of a strip, and wherein the ridge or the strip of the one or more alignment counter-element is oriented perpendicular to the ridge or the strip of the corresponding alignment element.

* * * * *